United States Statutory Invention Registration [19]

[11] Reg. Number: H268

Owen [43] Published: May 5, 1987

[54] ELMO BUMPY SQUARE PLASMA CONFINEMENT DEVICE

[75] Inventor: Larry W. Owen, Oak Ridge, Tenn.

[73] Assignee: The United States of America as represented by the United States Department of Energy, Washington, D.C.

[21] Appl. No.: 591,646

[22] Filed: Mar. 20, 1984

[51] Int. Cl.[4] ..... G21B 1/00

[52] U.S. Cl. ..... 376/138; 376/126; 376/133; 376/140

[58] Field of Search ..... 376/138, 126, 133, 142, 376/140, 121, 194

[56] References Cited

U.S. PATENT DOCUMENTS

| | | | |
|---|---|---|---|
| 2,790,902 | 4/1957 | Wright | 376/194 |
| 3,170,841 | 2/1965 | Post | 376/140 |
| 3,668,067 | 6/1972 | Christofilos . | |
| 3,728,217 | 4/1973 | Dandl | 376/138 |

OTHER PUBLICATIONS

CONF-830758, 7/83.

Elmo Bumpy Square, status report, Jan. 1984, prepared by Oak Ridge National Lab, Uckan.

Nuclear Fusion, vol. 16, No. 3, 7/76, pp. 441–445, Shohet et al.

IEEE Trans. on Plasma Science, vol. ps-6, No. 3, 9/78, Roth, pp. 270–294.

IAEA-CN-41/L-2, (1982), Fujiwara et al., pp. 197–207.

*Primary Examiner*—Harvey E. Behrend

*Attorney, Agent, or Firm*—David E. Breeden; Stephen D. Hamel; Judson R. Hightower

[57] ABSTRACT

An Elmo bumpy square (EBS) plasma confinement device is provided by four linear sections formed of a plurality of series connected magnetic mirror confinement segments linked by four 90° sections. Each 90° section is formed of toroidal solenoid-type confinement windings which produce a strong curved solenoidal-type magnet field. Each magnetic mirror segment includes axisymmetric mirror field windings coupled with microwave cavities to form a linear axisymmetric bumpy magnet field, for confinement of a plasma. As in a conventional Elmo bumpy torus, each microwave cavity contains a high-beta, relativistic electron plasma ring which rotates about the confined plasma to provide magnetohydrodynamic stability of the plasma. The electron plasma ring is formed and maintained by microwave heating through the introduction of microwave energy at a specified frequency into each cavity. The 90° sections, or corners, are formed by high winding density solenoidal-type coils which produce very strong magnet fields for confinement of the high energy particles of the plasma passing about the corner sections thereby reducing the normal detrimental toroidal curvature effects found in an EBT.

In a preferred embodiment of the invention, the corner windings are generally elliptically shaped in order to fan the magnetic field lines orthogonal to the plane of the corner radius to limit the radial spread of the magnetic field lines and further reduce the curvature effects on the confined plasma.

5 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELMO BUMPY SQUARE PLASMA CONFINEMENT DEVICE

BACKGROUND OF THE INVENTION

This invention, which is a result of a contract with the United States Department of Energy, relates generally to the art of magnetic field confinement of plasmas in closed magnetic field line devices and more specifically to improvements in the containment field geometry of an Elmo bumpy type plasma confinement device.

One form of a closed magnetic field line plasma confinement device is an Elmo bumpy torus which may be referred to as one of a number of linked toroidal closure plasma devices in which a plurality of magnetic mirror type confinement segments are linked to form a torus. By linking the segments together, plasma escaping from the ends of one mirror sector is not lost, as in a simple open ended mirror device, because it enters an adjoining mirror sector.

Unfortunately, plasmas confined simply by toroidally linked mirror devices do not have magnetohydradynamic (MHD) stability. However, in an Elmo bumpy torus (EBT) MHD instability has been overcome by periodic spatial modulation of the magnetic field, the so-called "bumps" in the confinement field and by surrounding each bump with a microwave cavity supplied with radiofrequency energy to form a ring of electrons which rotate about the confined plasma in the bump. Electric currents generated by these rings produce changes in the magnet field that provide gross MHD stability to the confined central plasma. Details of a stabilized bumpy torus plasma confinement device of this type may be had by referring to U.S. Pat. No. 3,728,217 issued Apr. 17, 1973 to R. A. Dandl, the subject matter of which is incorporated herein by reference thereto.

Several aspects of the EBT concept make it attractive as a fusion device: the large aspect ratio (major radius of the plasma torus R/the minor radius r), noninterlocking circular field windings with modest field; and the steady-state operation. However, one of the major concerns with the conventional toroidal geometry of the EBT is the problem associated with plasma particle confinement in curved magnetic fields. Results of recent plasma confinement calculations for and preliminary reactor assessments of advanced bumpy torus configurations has been summarized in an Oak Ridge National Laboratory Report entitled "ELMO Bumpy Square Status Report" dated Jan. 1984 and compiled by N. A. Uckan and in a publication of the proceedings of a workshop entitled "Advanced Bumpy Torus Concepts" Conf.-830758, edited by N. A. Uckan and published October 1983. The subject matter of these references being incorporated herein by reference thereto.

Optimizing the design of an EBT requires a magnetic field configuration that maximizes particle confinement within the toroidal volume. The toroidal curvature of the magnetic field in an EBT results in an inward shift of the particle drift orbits toward the major axis thereby reducing the average length of time particles are confined by the magnetic field. Particles with different components of velocity parallel to the magnetic field are shifted inward by different amounts. The resulting dispersion in drift orbits enables particles to diffuse or random walk out of the plasma by coulomb collisions with other particles. This plasma loss is minimized by minimizing the dispersion in drift orbits that results from the toroidal curvature of the magnetic field. In the standard EBT (toroidal) geometry the only way to reduce the plasma loss and maximize the particle confinement time is to make the device larger.

Thus, there is a need for an improved geometric configuration of an Elmo bumpy type plasma confinement device which takes advantage of the desirable characteristics of this type of confinement while eliminating the detrimental effects of a conventional toroidally closed plasma confinement device of the Elmo bumpy type, i.e., the EBT.

SUMMARY OF THE INVENTION

In view of the above need, it is an object of this invention to provide an Elmo bumpy type plasma confinement device with improved particle and energy confinement time over that of a conventional Elmo bumpy torus configuration.

Further, it is an object of this invention to provide an Elmo bumpy type plasma confinement device as in the above object which also provides the advantage of smaller physical size through increased volumetric confinement efficiency.

Other objects and many of the attendant advantages of the present invention will be made evident from the following detailed description of a preferred embodiment of the invention taken in conjunction with the drawings.

In summary, the invention is an Elmo bumpy type plasma confinement device having a polygonal configuration of closed magnet field lines for improved plasma confinement. In the preferred embodiment, the device is of a square configuration which is referred to as an Elmo bumpy square (EBS). The EBS is formed by four linear magnetic mirror sections each comprising a plurality of axisymmetric assemblies connected in series and linked by 90° sections of a high magnetic field toroidal solenoid type field generating coils. These coils provide corner confinement with a minimum of raidal dispersion of the confined plasma to minimize the detrimental effects of the toroidal curvature of the magnetic field. Each corner is formed by a plurality of circular or elliptical coils aligned about the corner radius to provide maximum continuity in the closing of the magnetic field lines about the square configuration confining the plasma within a vacuum vessel located within the various coils forming the square configuration confinement geometry.

In an embodiment including elliptical coils in the corner sections, the confinement field is fanned in directions perpendicular to the equatorial plane of the corner radius to further minimize radial dispersion of the plasma particle, drift orbits thereby further reducing the detrimental curvature effects.

BRIEF DESCRIPTION OF THE DRAWINGS

FIG. 6 is an enlarged detailed plan view of one corner of the EBS of FIG. 5 sectioned at the midplane (equatorial plane).

DESCRIPTION OF THE PREFERRED EMBODIMENTS

Figure 1:
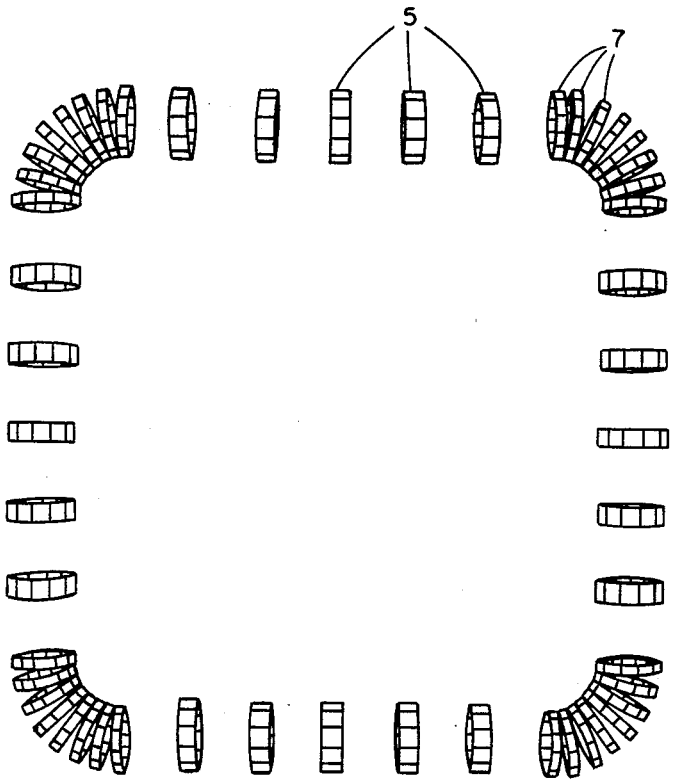
FIG. 1 is a schematic illustration of the coil geometry of an EBS plasma confinement device according to the present invention.

Referring now to FIG. 1, the Elmo bumpy square geometry, in which the magnetic axis is not circular but is shaped like a square, consists of linear sections formed of a plurality of axisymmetrically disposed mirror coils 5 which are spaced apart along an axis between microwave cavities, as will be described with reference to FIG. 5, to form linear mirror type segments with components similar to the hot electron ring stabilized EBT device described in the above referenced U.S. Pat. No. 3,728,217.

Figure 2:
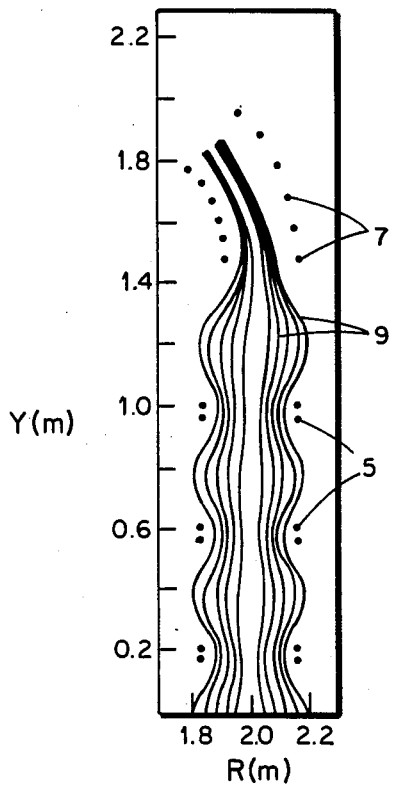
FIG. 2 is a plot of one field period (one straight and one corner section) of the magnetic field lines and the location of the current filaments that approximate the mirror coils and the toroidal solenoid section displayed in the equatorial plane of an EBS coil configuration as shown in FIG. 1, where R (meters) is distance from the geometric center and $\gamma$ (meters) is distance above the equatorial plane of the device. These dimensions are for a device having an equivalent major radius (circumference/$2\pi$) of 2.44 meters and a minor radius of $\approx 0.17$ meters.

A major feature of the EBS is the vertices, or corners, of the square. It is in these regions that all the curvature of the magnetic field lines to close the device is localized. Ideally, the plasma is best confined within symmetrical closed magnetic fields. However, this is impossible to obtain in a closed containment device. Any curvature of the containment field produces a nonsymmetrical confinement field due to the difference in length of the closed field lines between the inner and outer radius of the field. This adverse effect is minimized in the EBS by the use of high magnetic solenoid field producing windings (8 windings spaced about each 90° corner section of the square). The magnetic field in the corners is much stronger than the average magnetic field in the mirror sections as illustrated by the compression of the field lines 9 in one corner section of the device as shown in the graph of FIG. 2. In FIG. 2, the coils are shown by means of double and single dots for the mirror coils 5 and the corner solenoid coils 7, respectfully. Thus, the curvature effects are localized in regions of high magnetic field to minimize the effect on single particle drift orbits, volumetric efficiency, core plasma pressure surfaces, etc.

In practice, the radial position of the corner sections may be adjusted, relative to the axis of the straight sections, in such a way that the contours of the constant magnetic field lines (Mod-B surfaces) in the transition sectors that join the sides and corners and those in adjacent transition mirror cavities are aligned. This aids in the formation of an average magnetic well by aligning the hot electron rings in the "transition" cavities (cavity between the corner solenoid and an adjacent mirror coil) on the same flux lines on which they are formed in the axisymmetric mirror cavities of the straight sections.

Figure 3:
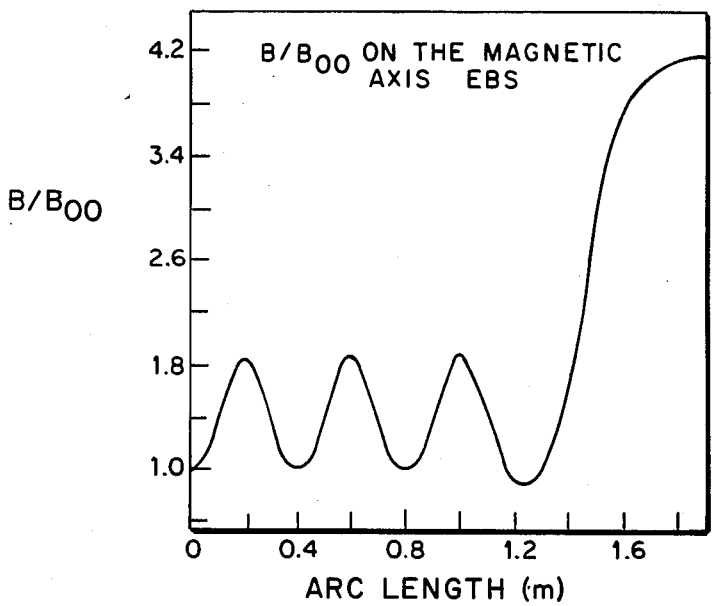
FIG. 3 is a plot of the magnet field for one field period, shown in FIG. 2, as a function of arc length along the central field line that forms the magnetic axis of the EBS configuration as shown in FIG. 1.

A major feature of EBS is the high field corners in which all toroidal effects are concentrated. In FIG. 3 the normalized magnetic field strength is plotted for one field period as a function of arc length along the magnetic axis. The on-axis mirror ratio in the sides (defined as the ratio of B on the axis at a mirror coil throat to B on the axis in the reference cavity midplane) is seen to be 1.88 and the "global" mirror ratio (B at the corners/B at the reference midplane, $B_{00}$) for this particular case is 4.2. From the shape of the curve in FIG. 3, one can classify particles in the EBS vacuum magnetic field as being mirror trapped in a single linear mirror segment, mirror trapped between the high field corners, or passing. (There will also be transitional particles that turn or barely pass near the various field maxima.) Since the different classes of particles have different drift motion, it should be possible to vary the vacuum field confinement properties of the system by varying the ratio of the coil currents in the sides and corners of the square. For example, if the field in the sides were set at a value of 0.5 Tesla (midplane) similar to an EBT, and the corners were operated at the maximum field, global mirror ratios of approximately 6 can be obtained. This could prove to be a convenient "knob" for varying the effective aspect ratio and the confinement properties of the device.

Figure 4A:
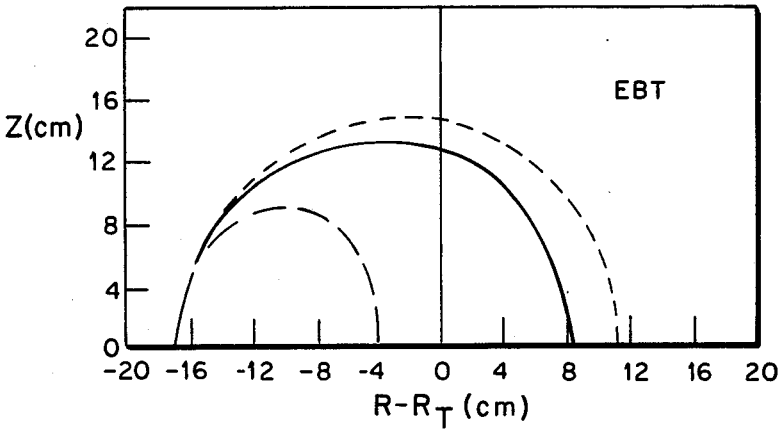
FIGS. 4*a* and 4*b* are plots of single particle drift orbits (dashed lines) and § dl/B contours (solid lines) for (a) a typical EBT and (b) the EBS configuration, displayed in a reference midplane (only the upper half portions are shown). Here B is magnetic field strength and l is arc length along the magnetic field line. Orbits for deeply trapped particles (velocity perpendicular to the magneic field lines) and extreme passing particles (velocity generally parallel to the field lines) are denoted by the short-dash and long-dash curves, respectively. The transitional particle orbit near the boundary between trapped and passing that represents the worst confined drift orbit in the vacuum magnetic field is denoted by the dotted curve in FIG. 4*b*. The absence of this curve for an EBT illustrates that the worst orbit does not close within a minor radius of 17 cm.
Figure 4B:
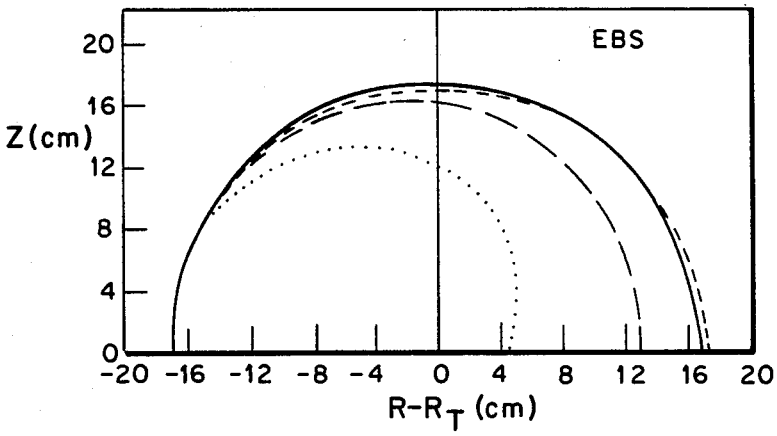

Single particle drift orbits and § dl/B contours (core plasma pressure surfaces) for a typical EBT and the EBS configuration are displayed in a reference midplane in FIG. 4. The selected orbits (dashed curves) and § dl/B contours (solid curves) pass through the point $(R-R_T)=-17$ cm in the equatorial plane. For an EBT the worst confined drift orbit does not close within a minor radius of 17 cm and is not shown. These particles collide with the containment walls and are lost. For an EBS the drift orbits of deeply trapped particles and the § dl/B surfaces are almost exactly centered on the minor axis. In addition the extreme passing particle orbit is much better centered than in the standard EBT and the worst confined transitional particle orbit, corresponding to a particle that turns near the field maximum at the center of the corner section, is shifted inward by only about 6 cm. This dramatic reduction in the dispersion of drift orbits about the plasma pressure surfaces means that both diffusive and direct particle losses in EBS are correspondingly reduced.

Figure 5:
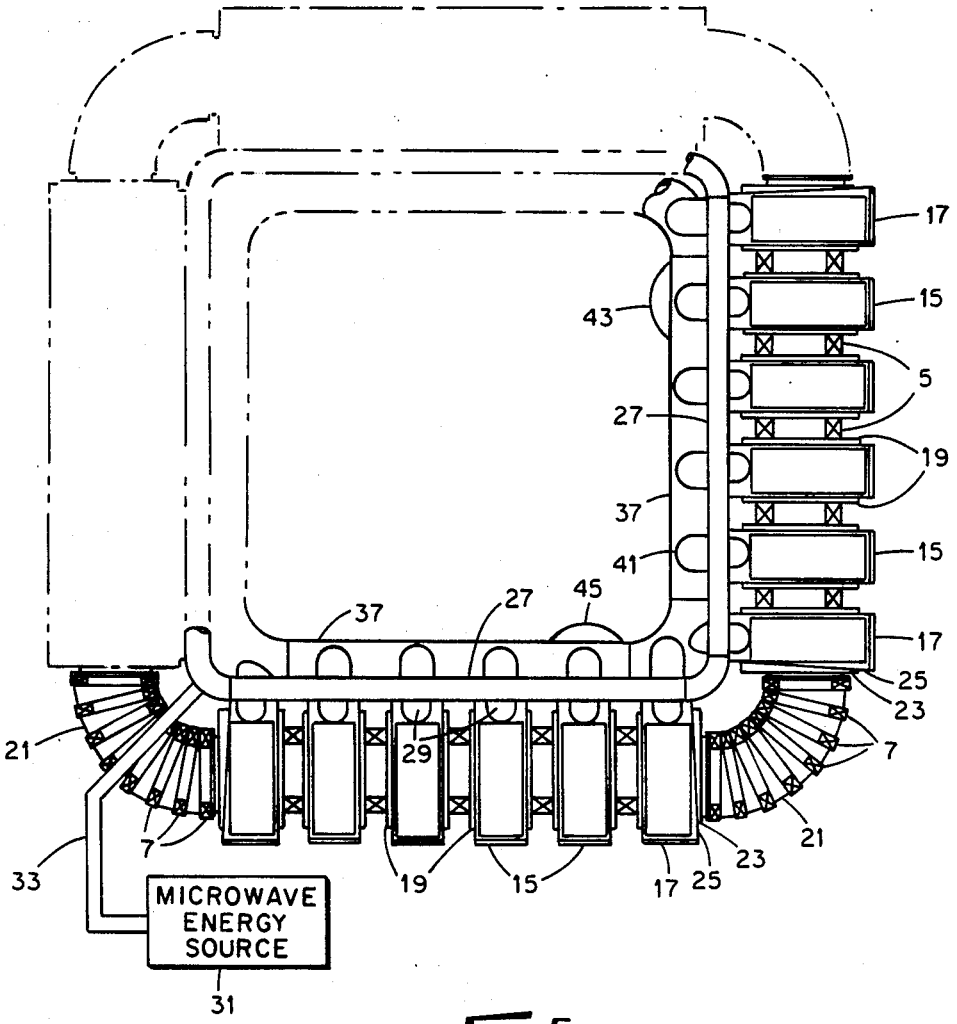
FIG. 5 is a schematic drawing of a plan view of an EBS according to the present invention having the coil arrangements as shown in FIG. 1, which are denoted by like reference numerals.

Referring now to FIGS. 5 and 6 there is shown a plan view and an enlarged sectioned plan view of one corner thereof, respectively, of an EBS. The EBS plasma confinement device has four Elmo bumpy mirror type confinement segments forming each straight section of the device linked by four corner sections to form a closed containment device. Each straight segment includes four axisymmetric microwave cavities 15 and two transition microwave cavities 17 which comprise enclosed aluminum housings to form portions of the vacuum housing for the contained plasma along each straight section of the device. The mirror coils 5 are disposed axisymmetrically on opposite sides of the microwave cavities about cylindrical aluminum members 19 disposed axisymmetrically between the cavity housings 15 and the end transition cavities 17 to complete the vacuum housing along the linear sections of the device.

Each corner section is formed of a plurality of cylindrical cross section, wedge-shaped members 21 formed of aluminum and welded together to form the 90° corner sections. Each corner section is connected to the adjacent transition cavities 17 by means of aluminum flanges 23 which are shaped to provide connection between the canted end plates 25 of the transition cavity housings 17. Typically, right hand ends of cavities 17 are canted $\approx 4$ degrees relative to the left hand ends. The purpose of the canted end closure of the transition cavities 17 is to facilitate removal of caivities 17 without disturbing the corner sections. The assembled corner housings are provided with annular grooves adapted to receive the corner solenoid field windings 7.

As shown in FIG. 5, each of the microwave cavities (15, 17) is connected to a source of microwave energy through a microwave distribution manifold 27 coupled to each of the cavities through feed couplings 29. A microwave energy source 31, such as a gyrotron source, is coupled to the manifold 27 by means of a gyrotron/-microwave manifold interfacing wave guide 33. The microwave energy is introduced into the cavities at a specified frequency (typically 28-GHz) and energy level to sustain the hot electron rings, illustrated by dotted lines 35 in FIG. 6, which rotate about each bump in the magnetic confinement field lines in each of the cavities (15, 17) at a location approximately coincident with the outermost closed flux surface 10. This microwave energy also heats the cooler toroidally confined electrons that, along with the toroidally confined ions, forms the fusion relevant core plasma 46.

A vacuum manifold 37 is connected to communicate with the interior of the assembled vacuum housing of the device through vacuum manifold/cavity interface couplings 41 connecting each cavity to the manifold 37. The manifold is connected to vacuum pumps 43 and 45 located below the manifold 37.

The assembled machine, as shown in FIG. 5, is supported from the floor by means of coil support stands (not shown) which are located beneath and attached to each mirror coil housing member 19. These stands provide support for the entire assembly as well as magnetic force restraint.

In the experimental device shown, the straight sections are formed of four mirror segments each having a length or spacing between mirror coils of 40 cm. The equivalent major radius of the device (circumference/$2\pi$m) is about 2.0 meters. The mean radius of curvature of the corner sections about which the coils 7 are disposed is 44.2 cm. Each of the corner coils 7 is identical in size, shape and winding pattern to one-half of a mirror coil 5 cut by a vertical symmetry plane. The distance from the geometric center of the device to the axis of coils 5 is $\approx 1.65$ m. Each of the coils 5 is comprised of 44 turns of copper conductor, which is water cooled in a conventional manner not shown.

As pointed out above, the corner sections may be formed with elliptical cross section coils disposed about an elliptical vacuum housing to provide vertical fanning of the magnetic field lines perpendicular to the radius of the corners. Typically, these coils would have height to width ratios of about 3 to 1 to provide the desired radial compression of the field lines and further reduce the curvature effects.

The EBS as shown in FIG. 5 provides a confinement for a connected core plasma 46, such as a hydrogen or other light species, in a closed field line geometry which is well centered within the containment field and thus improves particle confinement time. The square geometry of the EBS suggests the possibility of using different techniques for heating the core plasma. Access at the corners permits a long path length for neutral beam injection heating of the plasma, and lack of magnetic moment conservation at typical beam energies should isotropize the hot ion distribution rather quickly. In an EBS that utilizes an EBT-like magnetic mirror field ($\approx$1 Tesla in the mirror cavities), slow wave ion cyclotron resonance heating and 60 GHz electron cyclotron resonance heating can be lauched from the high-field corners with the electron rings sustained by 28 GHz second harmonic heating at $B \approx 0.5$ Tesla.

The volumetric efficiency, or filling factor, is a measure of the efficiency with which the available volume (usually defined by the magnetic field lines that just graze the vacuum vessel in the mirror coil throats) is utilized by the plasma. If the volume utilization is poor, then much of the magnetic field and microwave energy is correspondingly poorly utilized. In a typical EBT the volumetric efficiency is only about 50%, whereas in the EBS configuration of approximately the same size, it is greater than or about 95%. This factor of two improvement in volumetric efficiency is very important for near term experimental devices and fusion reactor economics.

Thus, it will be seen that an improved, closed magnetic field line plasma confinement device has been provided which offers the possibilities of (1) obtaining an order of magnitude improvement in the average particle confinement time, (2) a factor of two improvement in the volumetric efficiency, (3) using new plasma heating techniques that would not be possible in a standard bumpy torus, (4) significantly improving electron cyclotron heating efficiency and energy confinement through better centering of the particle drift orbits and (5) improving stability by forming the hot electron rings in a nearly axisymmetric geometry that is more favorable to obtaining an average magnetic well than in a toroidal geometry.

Although the invention has been described with reference to a specific embodiment, those skilled in the art will recognize that various modifications and changes may be made therein without departing from the spirit and scope of the invention as set forth in the following claims. For example, the geometric configuration is not limited to the illustrated square configuration. Other polygonal configurations such as a racetrack, triangle, pentagon, etc., may be used. The two mirror sectors of each linear segment adjacent each corner are not purely axisymmetric. However, the EBS is a reasonable compromise between maximizing the number of axisymmetric mirror sectors and minimizing the number of transition sectors (corner sections).

What is claimed is:

1. A closed magnetic field line plasma confinement device, comprising:

a plurality of linear magnetic plasma confinement sections each comprising an identical plurality of axisymmetric assemblies of plasma confinement mirror segments connected in series to generate magnetic fields having continuous magnetic field lines extending through said confinement sections for confining a plasma, each of said segments including an annular mirror field plasma confinement means of the bumpy type including an microwave cavity formed by an enlarged diameter portion of a vacuum containment vessel confining the plasma along said confinement section wherein a hot electron ring is formed about an enlarged diameter portion of the magnetic field lines of each mirror field segment to provide magnetohydrodynamic stability of a confined plasma;

a plurality of curved sections formed of curved generally cylindrical sections linking said plurality of linear confinement sections into a generally polygonal magnetic plasma containment vessel; and solenoid coil means disposed about each of said plurality of curved sections for generating a solenoidal magnetic field extending through each of said curved sections, said solenoidal magnetic fields being sufficiently stronger than the average magnetic fields generated in said plurality of linear confinement sections to generate compressed, continuous field lines within a smaller confinement diameter than that of said linear confinement sections and aligned to form continuous magnetic field lines with those of said linear sections so that the radial drift of confined plasma particles passing through said curved sections is minimized, thereby providing stability of the confined plasma.

2. The plasma confinement device as set forth in claim 1 wherein said plurality of linear plasma confinement sections and said plurality of curved sections is four thereby forming a generally square plasma confinement device.

3. The plasma confinement device as set forth in claim 2 wherein each of said curved sections has a length substantially shorter than the length of said linear sections.

4. The plasma confinement device as set forth in claim 3 wherein each of said curved sections are 90° sections having a common radius over the length thereof and displaced radially outward with respect to the axis of adjacent linear sections so that the contours of constant magnetic fields in the midplane of the end segments of adjacent linear sections are aligned on the same set of field lines on which they are formed in the linear sections.

5. The plasma confinement device as set forth in claim 4 wherein said solenoid coil means includes a plurality of circularly shaped, planar coils uniformally diposed about said corner sections.

* * * * *